(12) United States Patent
Leblanc et al.

(10) Patent No.: US 8,868,640 B2
(45) Date of Patent: Oct. 21, 2014

(54) SYSTEM AND METHOD FOR CENTRALIZED RETRIEVAL AND DELIVERY OF CONTENT TO MOBILE DEVICES USING A SERVER BASED RSS FEED

(75) Inventors: Michael Leblanc, Fredericton (CA); Jody Glidden, Sterling, VA (US); Ian Brian Delong, Fredericton (CA); Silvio Verzilli, Fredericton (CA); David James Hudson, Fredericton (CA)

(73) Assignee: BlackBerry Limited, Waterloo, Ontario (CA)

( * ) Notice: Subject to any disclaimer, the term of this patent is extended or adjusted under 35 U.S.C. 154(b) by 123 days.

(21) Appl. No.: 12/435,100

(22) Filed: May 4, 2009

(65) Prior Publication Data

US 2010/0070565 A1    Mar. 18, 2010

Related U.S. Application Data

(60) Provisional application No. 61/096,406, filed on Sep. 12, 2008.

(51) Int. Cl.
| | |
|---|---|
| *G06F 15/16* | (2006.01) |
| *H04L 29/08* | (2006.01) |
| *H04W 4/18* | (2009.01) |
| *G06F 17/30* | (2006.01) |

(52) U.S. Cl.
CPC ............... *H04W 4/18* (2013.01); *H04L 67/26* (2013.01); *G06F 17/3089* (2013.01)
USPC ...................................................... 709/203

(58) Field of Classification Search
CPC ....... G06F 17/3089; H04L 67/26; H04W 4/18
USPC ...................................................... 709/203
See application file for complete search history.

(56) References Cited

U.S. PATENT DOCUMENTS

| | | | | |
|---|---|---|---|---|
| 7,325,042 | B1 * | 1/2008 | Soscia et al. ................... | 709/219 |
| 7,343,564 | B2 * | 3/2008 | Othmer ......................... | 715/774 |
| 7,937,582 | B1 * | 5/2011 | Lee ............................... | 713/155 |
| 2006/0155698 | A1 | 7/2006 | Vayssiere | |
| 2007/0011604 | A1 * | 1/2007 | Chiu ............................. | 715/513 |
| 2007/0077921 | A1 | 4/2007 | Hayashi et al. | |
| 2007/0156807 | A1 | 7/2007 | Ma et al. | |

FOREIGN PATENT DOCUMENTS

EP    1933244 A1    6/2008

OTHER PUBLICATIONS

Canadian Intellectual Property Office, Office Action dated Jun. 5, 2013, issued in Canadian Patent Application No. 2,737,078.
European Patent Office, Extended European Search Report dated May 16, 2014, issued in corresponding European Patent Application No. 09812558.6.

* cited by examiner

*Primary Examiner* — David X Yi
(74) *Attorney, Agent, or Firm* — Norton Rose Fulbright Canada LLP

(57) ABSTRACT

A system, server, and method are provided for delivering at least one web feed to at least one wireless device. The server subscribes to the at least one web feed. The server has a processor connected to a memory with at least one module stored in the memory for execution by the processor. The server is configured to: monitor the web feed status for an expiration of a refresh time; retrieve new content from the web feed upon expiry of the refresh time; process the new content and package the processed new content as a content package for delivery to the wireless device; and send the content package to the wireless device as a push delivery.

11 Claims, 6 Drawing Sheets

SYSTEM AND METHOD FOR CENTRALIZED RETRIEVAL AND DELIVERY OF CONTENT TO MOBILE DEVICES USING A SERVER BASED RSS FEED

CROSS REFERENCE TO RELATED APPLICATIONS

The present application claims priority to U.S. Provisional Application No. 61/096,406 filed Sep. 12, 2008, the entirety of which is hereby incorporated by reference.

TECHNICAL FIELD

The present disclosure relates generally to portable devices, and more particularly to a system and method for centralized retrieval and delivery of content to mobile devices using a server based RSS feed.

BACKGROUND

Currently, mobile content players receive content from a content server in HTML format via an RSS feed. This format only includes plain text, links to other URLs, embedded graphics, and hyperlinks to video and audio. The current model for RSS mobile content delivery is limited in that a majority of RSS feeds are not in a format that is easily reproduced on the various screen sizes of mobile devices. This can result in images, audio or video either being removed and replaced with links or moved to locations that are out of context with textual descriptions contained in the item. Video and audio files may not be in the proper format to be rendered on a mobile device and are therefore not rendered.

Some of the restrictions that result from the conventional approach mobile content player RSS feeds include: (a) images are shown as thumbnails and do not appear near text used as a header for those images; (b) images, video and audio have links placed in the text that requires the user to download this media separately, which practically makes the images, video and audio unavailable if the mobile device is out of network coverage; (c) proper video and audio format is needed from the RSS feed for the mobile device to render the video and audio; (d) users need to wait while downloading video or audio when the users access a RSS feed, which can take quite long based on network speeds in conventional mobile carrier networks; and (e) updated content in the RSS feed wastes bandwidth constantly sending updated versions of the content to the mobile device. Additionally, conventional models for allowing wireless device users in an organization to subscribe to RSS feeds leaves network administrators with little control over the content being delivered to the organization's wireless devices.

The conventional methods waste processing and battery resources on the wireless device while the user must take additional steps to retrieve the content using a pull mechanism, and also waste the user's time. Bandwidth is also wasted in the scenario of updated content being sent to the mobile device.

It would be desirable to have a method for delivering and receiving RSS feeds that addresses at least one of the above concerns.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

One aspect of the description provides a server for delivering at least one web feed to at least one wireless device. The server subscribes to the at least one web feed. The server has a processor connected to a memory with at least one module stored in the memory for execution by the processor. The server is configured to: monitor the web feed status for an expiration of a refresh time; retrieve new content from the web feed upon expiry of the refresh time; process the new content and package the processed new content as a content package for delivery to the wireless device; and send the content package to the wireless device as a push delivery.

Another aspect of the description provides a method for use on a server for delivering at least one web feed to at least one wireless device. The server subscribes to the at least one web feed. The method comprises monitoring the web feed status for an expiration of a refresh time; retrieving new content from the web feed upon expiry of the refresh time; processing the new content and packaging the processed new content as a content package for delivery to the wireless device; and sending the content package to the wireless device.

Figure 1:
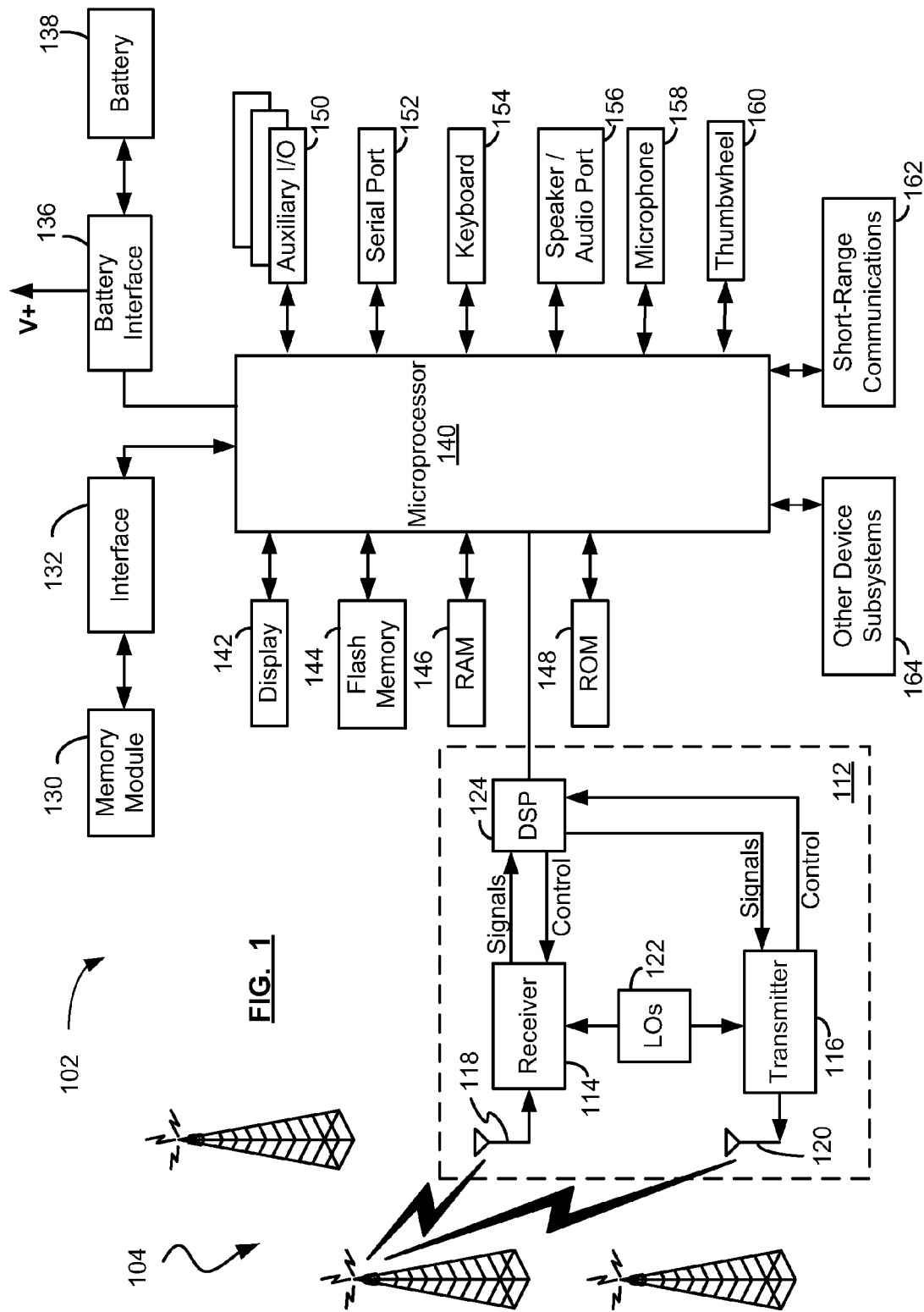
FIG. 1 shows in block diagram form a wireless device suitable for centralized retrieval and delivery of content using a server based RSS feed in accordance with one embodiment.

Reference is first made to FIG. 1, which shows a block diagram illustrating a portable wireless device 102 that is suitable for having centralized retrieval and delivery of content using a server based RSS (Really Simple Syndication) feed in accordance with one aspect of the present disclosure. While an RSS feed is used as an example, any information feed may be the subject of the present disclosure and while the term RSS feed is used throughout in an exemplary manner, the term RSS feed is intended to include any information web feed or channel. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, trackball, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel or trackball 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel or trackball 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
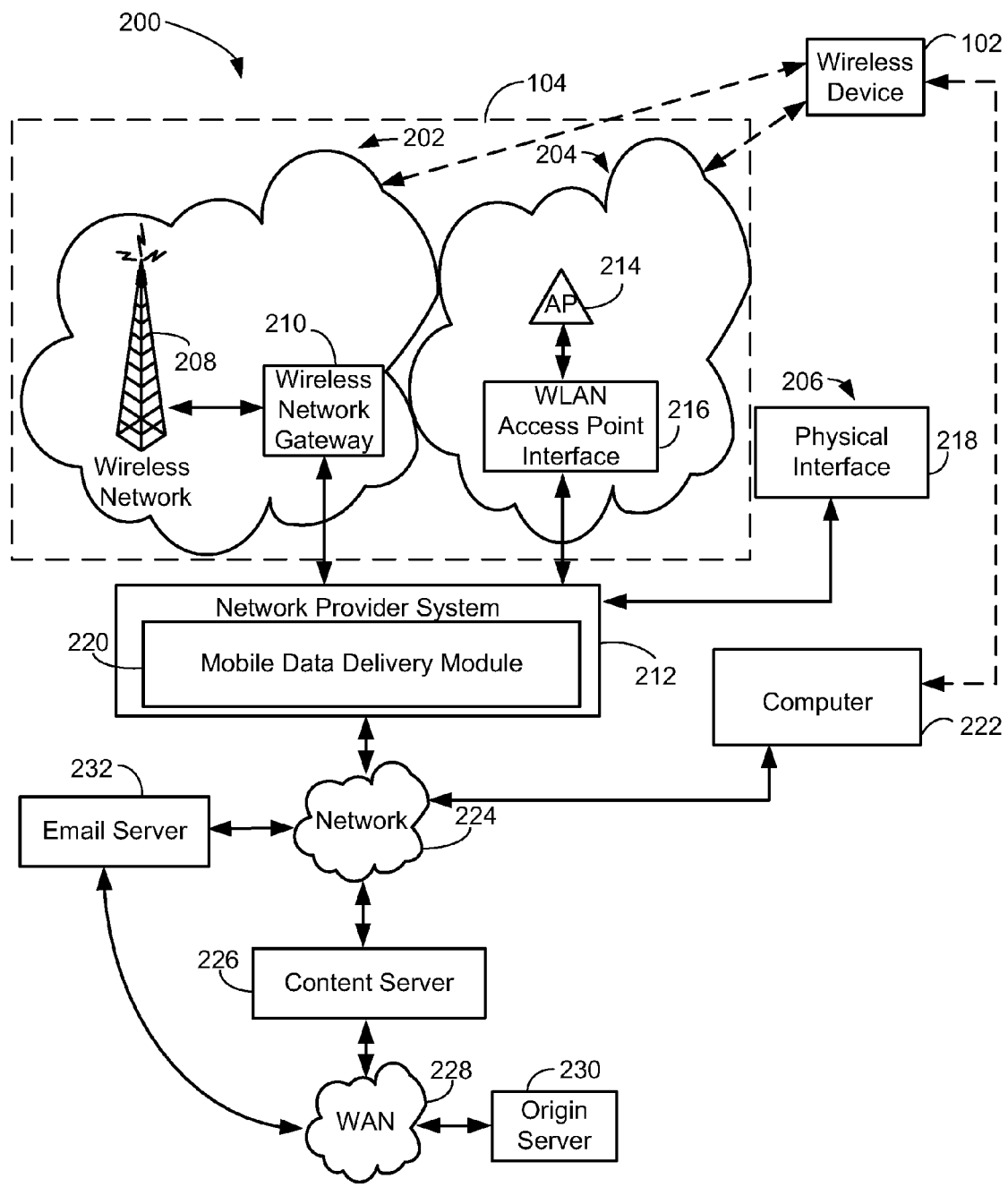
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), Evolution-Data Optimized (EV-DO), or 4G.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
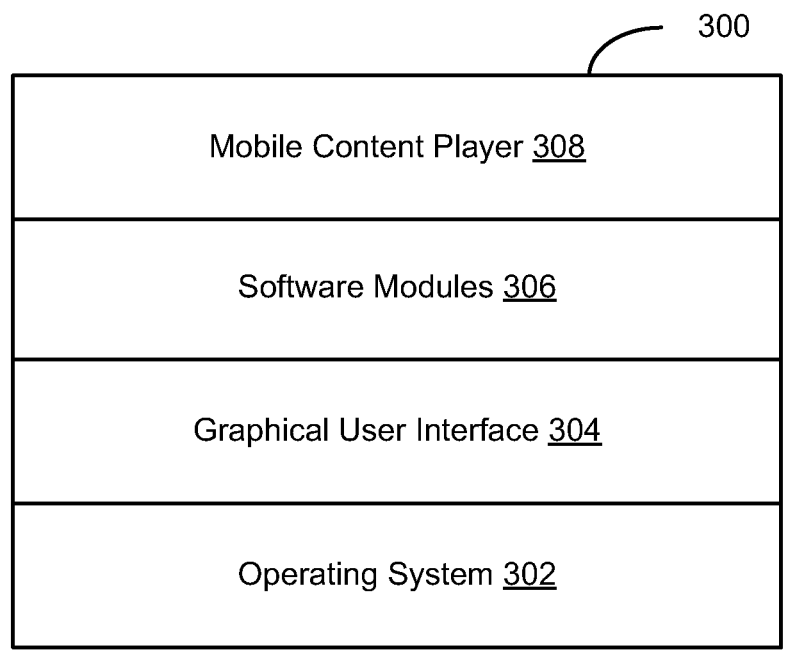
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel or track ball 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a mobile content player 308, which may also be referred to as a content delivery module. In one example, the mobile content player 308 may be integrated into the operating system 302. Alternatively, the module 308 may be a separate software component, as illustrated in FIG. 3. The content player 308 may include a number of components for interfacing with a content server, including a listener component, an email handler, a manifest, a delivery manager, a mobile content player, a transaction handler, and/or a request manager.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
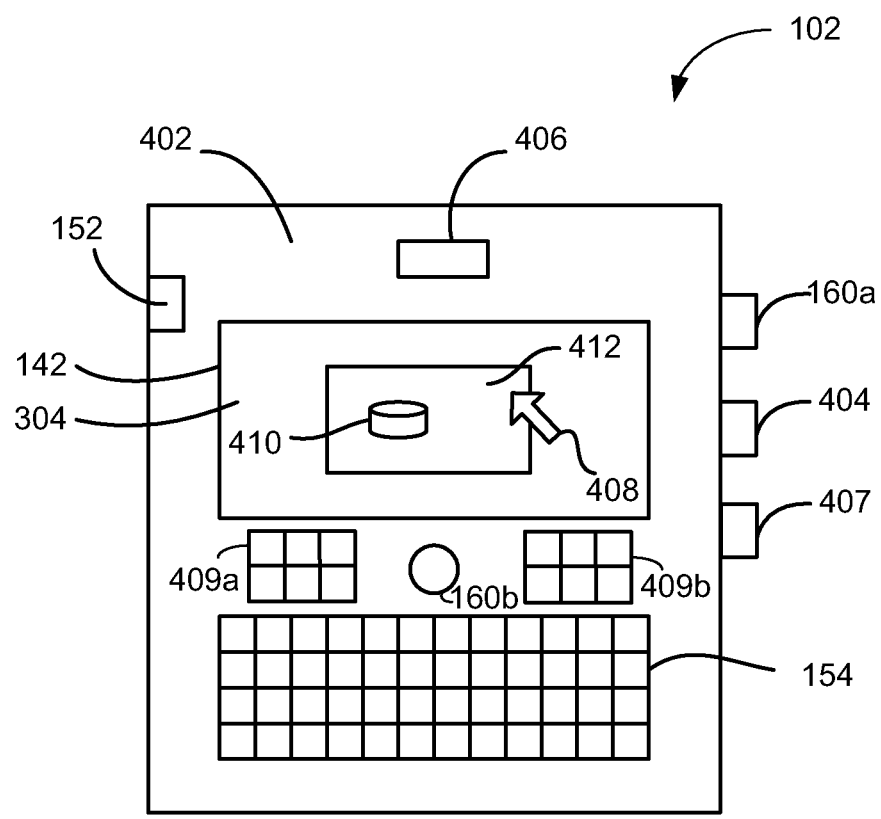
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160a, the trackball 160b) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel

160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

One aspect of the present disclosure provides a method for mobile content servers to subscribe to RSS feeds and to then provide the items from those feeds to wireless device users as a feed from the content server to the wireless device. The content server retrieves the RSS items and then converts the items to a format viewable by the wireless device and pushes the content to subscribed wireless devices. This approach offers a number of benefits, including: The user may select which RSS feeds he wishes to subscribe to and each new item in the feed is automatically pushed to the user's mobile device with no user intervention needed; The content server will retrieve the RSS item once, and only have to transcode or convert the content to a format to play on a wireless device once for each class of wireless device (e.g., a format suitable for a BlackBerry device from Research in Motion). This allows mobile users to view the content on their devices where before they could not because of formatting issues or missing content due to lack of connectivity. This also reduces server overhead as each RSS item is only transcoded or converted once for each class of wireless device. All pushed content may remain resident on the end user's wireless device. The content may also be played when the user is out of data or network coverage such as on an airplane, since all content needed to view the RSS feed has already been sent to the wireless device in a push fashion. Another aspect of the present disclosure gives administrators of an organization's content servers control over which web feeds may be made available to the wireless devices of the organization by restricting software installations on the wireless devices such that the mobile content player 308 is the only approved content player authorized for installation on the wireless devices. In this fashion, the mobile content player 308 may be restricted to content servers belonging to the organization, which only offer approved web feeds provided by the content servers. The administrators may also add corporate feeds to the available web feeds.

The terms "wireless device" and "mobile device" are used herein synonymously to refer to mobile wireless communication devices which communicate over a communication network, including cellular telephones, mobile phones, smartphones, wireless laptop computers, personal digital assistants (PDAs), pagers, etc. The term "push" is used herein to refer to a method of content delivery to a wireless device that is automatically delivered by a content server without any action being needed on the part of the wireless device user once the user has added a particular web feed. The content server may automatically deliver content to the wireless devices and the wireless devices may not have to periodically poll the content server, as is needed in the conventional approach. In another example, no action being needed on the part of the wireless device user means that content that conventionally needed to be retrieved with a URL link is automatically pushed to the wireless device without any input needed from the user.

One aspect of the present disclosure provides a method for mobile content servers to subscribe to web feeds such as RSS feeds and to then provide the items from those feeds to their respective wireless devices that use those particular mobile content servers. The content server may retrieve the content from the RSS feed and then convert the content to a format viewable by the wireless device. This reformatted content is then pushed to the wireless devices that are identified as having subscribed to the RSS feed that the users wish to receive.

Each content server may identify multiple RSS feeds that its subscribes to. Each content server may subscribe to RSS feeds by adding the feed to the server by defining the URL for the feed. The content server may record the settings from the RSS feed (e.g., the time to live and the recommended refresh time). There may be a process executed on the content server that sorts the RSS feeds in a queue based on the calculated time of the next recommended refresh. Once the timer for a RSS feed has expired, the process may retrieve any new content from the RSS feed. The content server may ensure that the content that the server is retrieving is a new item from the feed and also that it is not a duplicate item that has already been retrieved from another RSS feed.

The content server may retrieve any embedded media in the RSS item and convert that media to a format compatible with the wireless device. The content server will then create a content package using the reformatted media. The wireless device user or an administrator may select the RSS feeds that he wishes to have pushed to the wireless device from a list that the content server has subscribed to. The content server may make this list available to wireless devices either using the same names as the RSS feeds on which the content server feeds are based, or using alternative names. The content server may also filter out previous versions of an RSS item when updating from the RSS feed to eliminate old content that has since been updated. This option allows the server to only provide the latest updated content to the wireless devices. In one example, this may be accomplished by comparing the URL and/or a checksum of any media within the RSS feed (e.g., a video clip) to previously retrieved content with similar names or captions and determining if the items in the content are duplicates. In one example, for a news article that has had some text updated, the content server may only retrieve and convert the latest version of the item and only push the most recent version to the wireless devices instead of converting and pushing all previous versions.

Figure 5:
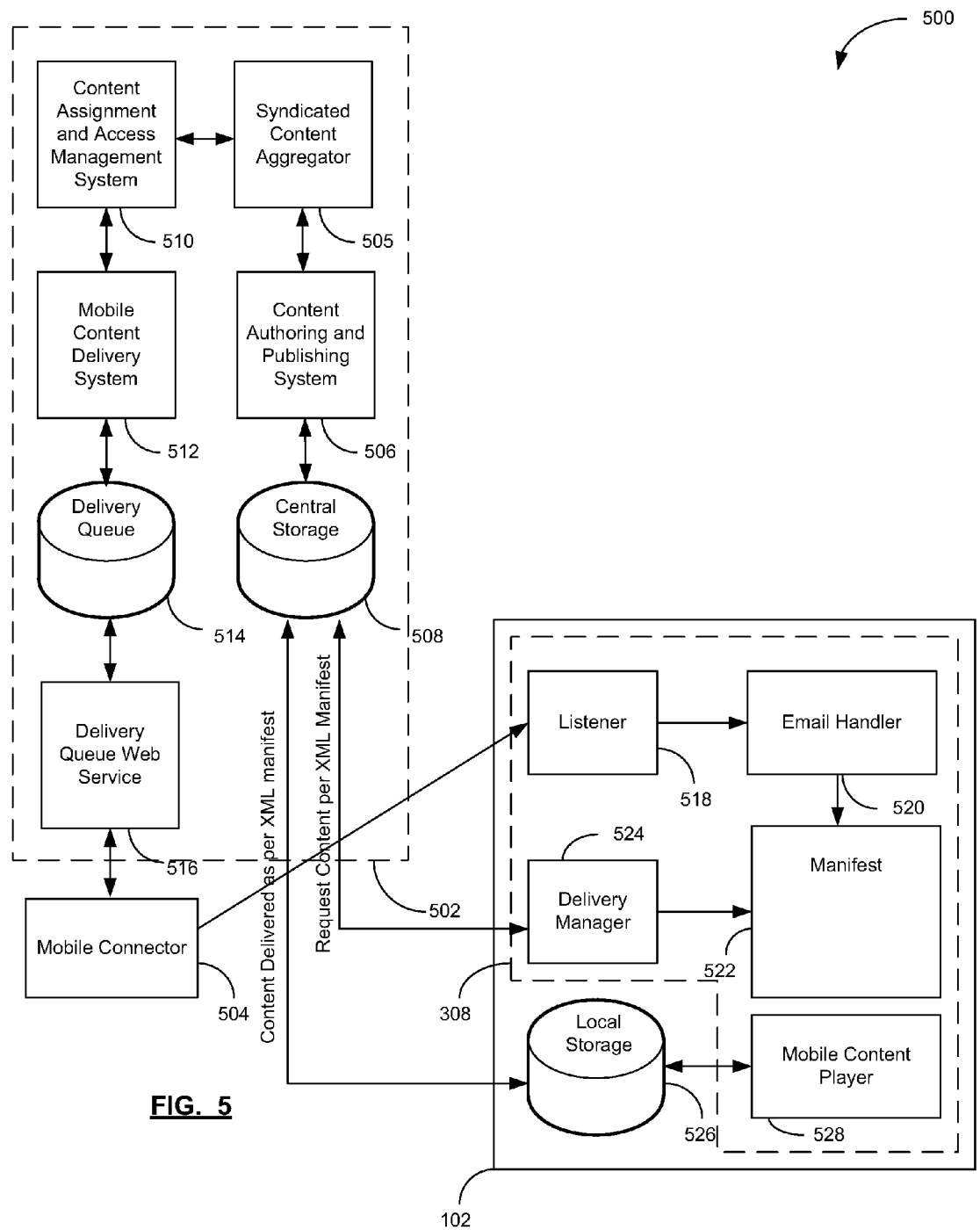
FIG. 5 shows in simplified block diagram form aspects of the communications system of FIG. 2 and the wireless device of FIG. 1 configured to deliver centralized retrieval and delivery of content using a server based RSS feed in accordance with one embodiment.

Reference is next made to FIG. 5, shows in simplified block diagram form a system 500 incorporating aspects of the communications system of FIG. 2 and the wireless device of FIG. 1 configured to deliver centralized retrieval and delivery of content using a server based RSS feed in accordance with one embodiment.

The system 500 generally includes at least one content server 502, a mobile connector 504, and one or more wireless devices 102, only one of each of which is shown in FIG. 5.

The content servers 502 may, for example, be implemented by the content server 226 shown in FIG. 2 and the mobile connectors 504 may be implemented, for example, by the network provider system 220.

The content server 502 includes a processor connected to a memory for executing instructions of various modules stored in the memory of the server. The memory of the content server 502 generally comprises a content aggregator or module 505, a content authoring and publishing system 506, a central storage 508, a content assignment and access management system 510, a mobile content delivery system 512, a delivery queue 514, and a delivery queue web service 516.

The content aggregator 505 may be a syndicated content aggregator. The content aggregator 505 may subscribe to web feeds such as RSS feeds identified or selected by an administrator of the content server 502. The syndicated content aggregator 505 may record the settings from the RSS feeds (e.g., the time to live, defined URL, and the recommended refresh time) and once the timer for a RSS feed has expired, the aggregator 505 may retrieve any new content from that RSS feed. The aggregator 505 may ensure that any RSS item retrieved is a new item and that it is not a duplicate item that has already been retrieved from a different RSS feed. The aggregator 505 may also retrieve any embedded media within the RSS item and convert that media to a format compatible with the wireless device 102. The embedded media may include graphics, sound, and/or video files. In one example, when converting media for the wireless device 102, the aggregator 505 may compress content, such as resizing images to a lower resolution, in order to save bandwidth sending content to the wireless device 102. The aggregator 505 may then create a package for delivery to the wireless device 102 using the reformatted media.

Alternatively, the aggregator 505 may filter out previous versions of an un-retrieved RSS item when updating from the RSS feed. This option allows the aggregator 505 to only provide the latest updated item to the wireless device 102, therefore avoiding sending duplicate items that have been updated. For example, the URL and/or a checksum of any media within the RSS feed (e.g., a video clip) may be compared to previously retrieved items with a similar name or caption to determine if the items are duplicates. In one example, a news article that has had some text updated more than once since the last time the aggregator 505 retrieved RSS items from that RSS feed may only be retrieved once (e.g., the latest version) by the content server 502. The aggregator 505 may then convert the latest version of the item to the desired format for the wireless device 102 and push the latest version to the wireless device 102 instead of converting and pushing all of the versions, therefore saving bandwidth.

The content authoring and publishing system 506 may be implemented using a number of systems in the market today, which provide for creation and central storage of content formatted for wireless devices. Alternatively, the content authoring and publishing system 506 may be implemented using solutions yet to be developed. The authoring may be accomplished by an appropriate application and then saved to a central server, such as the central storage 508, for access by the wireless devices 102. Once content has been created, the content may be stored in the central content storage 508 for later access. When a user has completed authoring content, the user may select to publish the content from a publish feature within a menu and then choose publication and/or delivery options for the created content. For example, an audio clip may be authored in an audio editing tool, saved, and then published to a central content server or central storage 508. In one example, another system 506 may manage access to this content.

Once the content has been created, the content may be assigned to users for consumption. This assignment may function as a trigger for the delivery to occur.

The mobile content delivery system 512 may receive requests for delivering content. These requests may originate from a system component that is assigning the content to users, such as the content authoring and publishing system 506 and/or the content assignment and access management system 510. When these requests are received, the mobile content delivery system 512 may look up the target and determine if the user has a wireless device 102 and if that device has a transport defined. The request may be verified to be in the proper format and then processed. If the user does not have a wireless device 102 or a transport has not been defined, then the appropriate response is returned to the requesting system. Every user may register with the mobile content delivery system 512 to ensure the deliveries can take place. Once this information is gathered, the mobile content delivery system 512 may place the request onto the delivery queue 514 with a status indicated as "new". In one example, the request may be an XML request.

Each XML request may be populated with a company identifier that determines which company is authorized to view the XML request on the delivery queue 514. Modifications to the content may occur after the content has been delivered. It may be left to the calling application to send a new delivery request for the content if it has changed.

The delivery queue web service 516 may listen for requests made by the mobile connector 504. These requests may determine if there are items on the queue 514 that the mobile connector 504 is able to extract and deliver.

The mobile connector 504 may poll the delivery queue web service 516 in predefined intervals to see if there is any content available that needs to be delivered. Each of the mobile connectors 504 may be configured for a specific content server or publisher. The mobile connectors 504 may issue a web services call to the delivery queue web service 516. This call may contain user credentials that the web service 516 authenticates to determine what queue items the mobile connector 504 is authorized to see. If there are no items authorized, the mobile connector 504 may wait for a predefined time interval to elapse and try again. If the mobile connector 504 does find an item on the queue, the mobile connector 504 may retrieve the queued item as, for example an XML document that describes the content. The mobile connector 504 may only process one queued item at a time, but may alternatively be configured to process multiple items at a time.

When the mobile connector 504 receives an XML transaction from the web service 516, the mobile connector 504 looks up the intended transport for the wireless device 102 type and delivers to the wireless device 102. The mobile connector 504 may further return result codes back to the delivery queue web service 516 based on the ability of the mobile connector 504 to successfully send the delivery request to the wireless device 102 infrastructure.

The mobile connector 504 may work simultaneously with several mobile platforms or transport types. This may include any transport that allows a real-time delivery of content to the wireless device 102, or any mechanism that publishes the content directly to the wireless devices 102 wirelessly.

The wireless device 102 content player 308 generally includes a listener 518, an email handler 520, a manifest 522, a delivery manager 524, and a mobile content player 528. The wireless device 102 also includes a local storage 526, which may be a portion of the memory 300 allocated for storage purposes. The manifest 522 may be periodically downloaded and stored as the manifest 522. However, the manifest 522 may be a working file as opposed to an application component of the content player 308.

The mobile content player 308 may be programmed to render various content types. The mobile content player 308 may accept the delivery of content from the mobile content delivery system 512 through the content server 502. The mobile content player 308 may also accept, for example, notifications when new content has been delivered to the wireless device 102, which may be in addition to the wireless device 102 receiving an email. There may be configurable notification options on the mobile content delivery system 512.

The delivery manager 524 may process a manifest file by retrieving each item specified by URL in the manifest file from the central content storage 508. These items may be placed in the wireless device local device storage 526. Once content is delivered to the wireless device 102, the content remains in the local storage 526 for the mobile content player 528 to render it. The delivered content may be removed from either the player 308 or from the mobile content delivery system 512. If the mobile content player 528 attempts to render content that has been removed from the local storage 526, then the player 308 may automatically attempt to retrieve the content from the content server 502.

The listener 518 may listen for the request sent from the mobile connector 504. The listener 518 may receive the XML manifest and extract each content URL from the XML manifest. The listener 518 may then send that URL to the delivery manager 524 for content retrieval using the content URLs.

If a request is received via e-mail, the wireless device 102 processes the e-mail through the email handler 520. The email handler 520 decrypts the contents of the email, if encrypted, that contain the instructions for retrieving the content manifest, reads the e-mail information into memory, and then deletes the e-mail from the user's wireless device 102 email inbox. The email handler 520 uses the information stored in memory to make an HTTP request to the content authoring and publishing system 506 requesting the content manifest. When the content authoring and publishing system 506 determines that a user's e-mail and PIN are valid, the system 506 sends the manifest to the mobile device 102 through its HTTP response.

While the content server 502 and mobile connector 504 are represented as distinct components and have a number of sub-components, any of these components or subcomponents may be implemented as modules running on a number of interconnected servers or on a single server, depending on the design criteria of a particular application. For example, any of the components 502, 504, 505, 506, 508, 510, 512, 514, and 516 may be implemented on any of the network provider system 212, the network 224, the content server 226, the email server 232, or the origin server 230. Alternatively, in one example, the components 502, 504, 505, 506, 508, 510, 512, 514, and 516 may be implemented on a single one of the network provider system 212, the network 224, the content server 226, the email server 232, or the origin server 230. Additionally, while one content server 502 and one mobile connector 504 are shown as an example in FIG. 5, the present description is intended to include any number of content servers (e.g., two or more) operating to provide push content to the wireless devices 102.

One aspect of the present disclosure provides enhanced RSS feeds to the wireless device 102. Potential practical applications of the present disclosure include: (a) wireless device users may be able to consume available RSS feeds offline, as the content is pushed to the wireless device and made available automatically before the user attempts to view it; (b) wireless device users subscribing to public audio or video broadcasts, such as Podcasts, may have these automatically pushed to their wireless device; (c) a company may create RSS feeds for different categories of its training content and have employees subscribe to the training categories relevant to their positions; (d) news audio and/or video broadcasts, such as Podcasts, that users wish to view may be automatically delivered to the wireless device without the user having to select to download the broadcasts individually or manually convert the broadcasts in any form; and (e) libraries of audio or video content may be delivered to wireless user populations securely.

Figure 6:
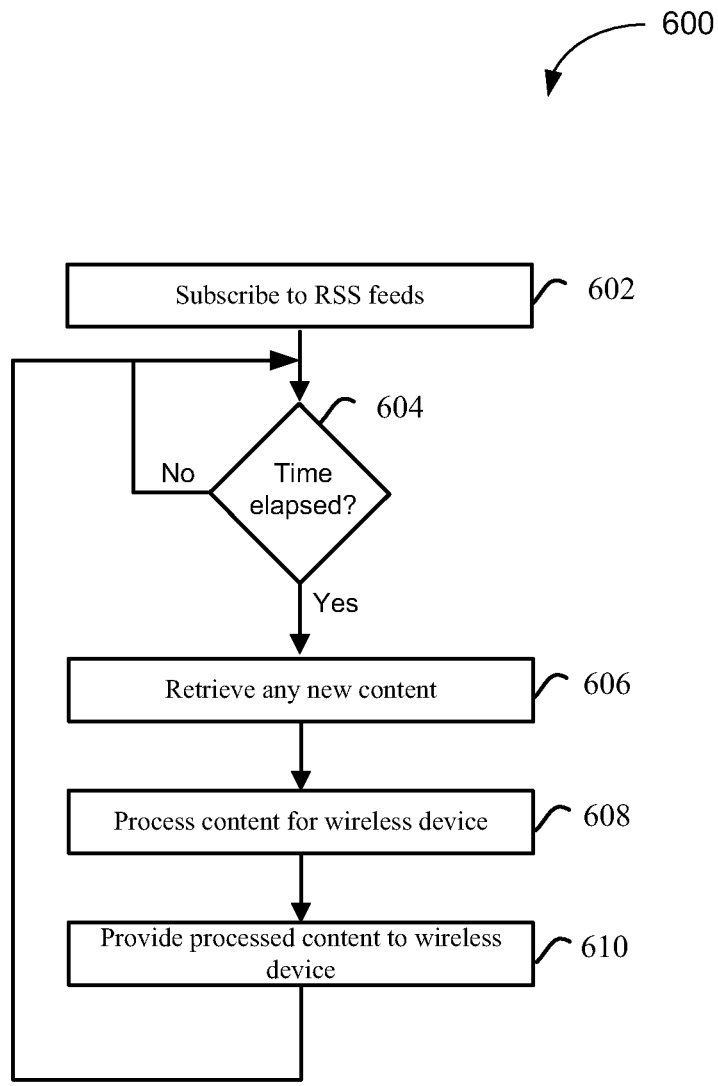
FIG. 6 shows in flow chart form a method for centralized retrieval and delivery of content using a server based RSS feed in accordance with one embodiment.

Reference is next made to FIG. 6, which shows a flow chart illustrating a method 600 for centralized retrieval and delivery of content using a server based RSS feed in accordance with one embodiment.

At a first block 602, a content server 502 subscribes to a number of web feeds that provide content. In one example, an administrator of the content server 502 may select RSS feeds providing content that may be of interest to users of the wireless devices 102 in the organization served by the content server 502. In one example, the syndicated content aggregator 505 of the content server 502 performs this task. The content server 502 may record settings such as the recommended refresh time for each RSS feed to which the server 502 subscribes.

Next, at a block 604, the content server 502 monitors the various subscribed RSS feeds for the expiration of the delays for the refresh times of the RSS feeds. When the refresh time of a particular RSS feed has expired, the method 600 proceeds to a block 606 where the content server 502 performs an update to retrieve new content available from the RSS feed since the last refresh. The content server 502 may retrieve the content available from the RSS feeds and may retrieve additional related content, such as material contained in links such as URLS embedded in the content retrieved from the RSS feeds, and media contained in the content such as any graphics, video, or other media contained within the feed content. In one example, the blocks 604 and 606 may be performed by the content aggregator 505 functioning on the content server 502.

Next, at a block 608, the content server 502 processes the content received at the block 606 for use by the wireless device 102. The processing of the content may involve many aspects, including removing any duplicate content such as old content that has been since updated resulting in more than one version of the same document being sent with the RSS update, filtering out old irrelevant content, transcoding content into a form suitable for the wireless device 102, compressing content to save bandwidth such as by resizing graphics files into smaller graphics more suitable for display on the wireless device 102, reformatting content into a format more suitable for the wireless device 102, and packing the processed content into a content package for delivery to the wireless device 102.

Next, at a block 610, the content package is sent to the wireless device 102. In one example, the content is sent to the wireless device 102 as described above, where an email is first sent to the wireless device 102 prompting the email handler 520 and/or delivery manager 524 to first retrieve an XML manifest containing a URL address of the content package and saving the manifest as the manifest 522, and then retrieving each item of the content package listed in the manifest 522. The delivery may therefore be performed as a push delivery needing no interaction with the user of the wireless device 102 and no polling of the RSS feed server by the wireless device 102 and making the content available to the user of the wireless device 102 for consumption at a future point in time and not needing any wireless connectivity since the content has already been sent to the wireless device 102.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A server for delivering at least one web feed to at least one wireless device, the server subscribing to the at least one web feed, the server being configured to:
    monitor, by a processor of the server connected to a memory with at least one module stored in the memory for execution by the processor, the web feed status for an expiration of a refresh time;
    retrieve new content, by the processor, including any material contained in links embedded in the new content and any media contained within the new content, from the web feed upon expiry of the refresh time;
    process the new content, by the processor, including any material contained in links embedded in the new content and any media contained within the new content, into a form suitable for the wireless device and package the processed new content as a content package for delivery to the wireless device; and
    send the content package, by the processor, to the wireless device as a push delivery,
    wherein the retrieving new content includes retrieving only a most recent version of all items in the new content;
    wherein the processing of the new content includes filtering out previous versions of all items to eliminate old content that has previously been updated and converting only the most recent version of all items in the new content;
    wherein the processing of the new content further includes at least one of: removing duplicate content from the new content, removing old content from the new content, transcoding the new content into a form suitable for the wireless device, compressing the new content, resizing graphics files into smaller graphics suitable for display on the wireless device, and reformatting content into a format suitable for the wireless device.

2. The server according to claim 1, wherein the at least one web feed includes at least one Really Simple Syndication (RSS) feed.

3. The server according to claim 2, wherein the at least one RSS feed includes a plurality of RSS feeds.

4. The server according to claim 1, wherein the at least one module includes a content aggregator.

5. The server according to claim 1, wherein the server includes a content server.

6. A method for use on a server for delivering at least one web feed to at least one wireless device, the server subscribing to the at least one web feed, the method comprising:
    monitoring the web feed status for an expiration of a refresh time;
    retrieving new content, including any material contained in links embedded in the new content and any media contained within the new content, from the web feed upon expiry of the refresh time;
    processing the new content, including any material contained in links embedded in the new content and any media contained within the new content, into a form suitable for the wireless device and packaging the processed new content as a content package for delivery to the wireless device; and
    sending the content package to the wireless device,
    wherein the retrieving new content includes retrieving only a most recent version of all items in the new content;
    wherein the processing of the new content includes filtering out previous versions of all items to eliminate old content that has previously been updated and converting only the most recent version of all items in the new content;
    wherein the processing of the new content includes at least one of removing duplicate content from the new content, removing old content from the new content, transcoding the new content into a form suitable for the wireless device, compressing the new content, resizing graphics files into smaller graphics suitable for display on the wireless device, and reformatting content into a format suitable for the wireless device.

7. The method according to claim 6, wherein the at least one web feed includes at least one Really Simple Syndication (RSS) feed.

8. The method according to claim 7, wherein the at least one RSS feed includes a plurality of RSS feeds.

9. The method according to claim 6, wherein the method is executed by a content aggregator module running on the server.

10. The method according to claim 6, wherein the sending the content package to the wireless device includes a push delivery to the wireless device.

11. The method according to claim 6, wherein the server includes a content server.

* * * * *